(12) United States Patent
Ohta et al.

(10) Patent No.: US 9,874,662 B2
(45) Date of Patent: Jan. 23, 2018

(54) ILLUMINATION DEVICE

(71) Applicant: PANASONIC INTELLECTUAL PROPERTY MANAGEMENT CO., LTD., Osaka (JP)

(72) Inventors: Takashi Ohta, Mie (JP); Tadashi Murakami, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 60 days.

(21) Appl. No.: 14/852,370

(22) Filed: Sep. 11, 2015

(65) Prior Publication Data
US 2016/0077243 A1 Mar. 17, 2016

(30) Foreign Application Priority Data

Sep. 12, 2014 (JP) .................. 2014-185797

(51) Int. Cl.
| | | |
|---|---|---|
| *F21V 3/00* | (2015.01) | |
| *F21V 5/00* | (2015.01) | |
| *G02B 3/00* | (2006.01) | |
| *F21K 9/60* | (2016.01) | |
| *F21Y 113/00* | (2016.01) | |
| *F21V 29/76* | (2015.01) | |
| *F21K 9/20* | (2016.01) | |
| *F21Y 105/10* | (2016.01) | |
| *F21Y 115/10* | (2016.01) | |

(52) U.S. Cl.
CPC ............. *G02B 3/0068* (2013.01); *F21K 9/60* (2016.08); *F21V 5/007* (2013.01); *F21K 9/20* (2016.08); *F21V 29/763* (2015.01); *F21Y 2105/10* (2016.08); *F21Y 2113/00* (2013.01); *F21Y 2115/10* (2016.08)

(58) Field of Classification Search
CPC ..... F21K 9/20; F21K 9/50; F21K 9/60; G02B 3/0068; F21V 5/007
USPC ................................ 362/311.02, 249.02, 235
See application file for complete search history.

(56) References Cited

U.S. PATENT DOCUMENTS

| | | | | |
|---|---|---|---|---|
| 8,328,395 | B2 * | 12/2012 | Kato .................. | G02F 1/133603 |
| | | | | 362/296.01 |
| 2010/0207131 | A1 * | 8/2010 | Chiang .................. | F21V 5/007 |
| | | | | 257/88 |
| 2012/0320585 | A1 * | 12/2012 | Lin ......................... | F21V 5/007 |
| | | | | 362/239 |

FOREIGN PATENT DOCUMENTS

JP        2009-129859 A      6/2009

* cited by examiner

*Primary Examiner* — Elmito Breval
*Assistant Examiner* — Jessica M Apenteng
(74) *Attorney, Agent, or Firm* — McDermott Will & Emery LLP

(57) ABSTRACT

An illumination device includes a light source, a device body to which the light source is mounted, and an optical member configured to control light distribution of light emitted from the light source. The light source includes LEDs arranged in a matrix form or a linear form. The optical member includes a lens portion configured to control light distribution of the LEDs on a row-by-row basis. The lens portion includes a recessed incidence portion on which the light emitted from the LEDs is incident, an elongated emission portion opposite to the incidence portion, and a pair of reflection portions which interconnects the incidence portion and the emission portion along a longitudinal direction thereof and totally reflects the light incident from the incidence portion. The emission portion is formed to have a plurality of successive convex surfaces when seen in a cross section taken along the longitudinal direction thereof.

5 Claims, 11 Drawing Sheets

ILLUMINATION DEVICE

CROSS-REFERENCE TO RELATED APPLICATIONS

This application claims priority to Japanese Patent Application No. 2014-185797 filed on Sep. 12, 2014, the entire contents of which are incorporated herein by reference.

TECHNICAL FIELD

The disclosure relates to an illumination device which uses an LED as a light source.

BACKGROUND ART

LEDs are capable of emitting high-brightness light with low electric power and are long in lifespan. Thus, the LEDs draw attention as light sources alternative to an incandescent lamp and a fluorescent lamp. The illuminance obtained by light emission of a single LED is lower than the illuminance of a HID lamp or the like. Thus, in an illumination device using an LED as a light source, a plurality of LEDs is used in order to realize a high illuminance. As one example of the illumination device of this kind, there is known an illumination device which includes a plurality of light sources disposed in a matrix form on one surface of a base having a rectangular flat plate shape (see, e.g., Japanese Unexamined Patent Application Publication No. 2009-129859)

The aforementioned illumination device capable of irradiating high-illuminance light is used for owl beam illumination that illuminates, for example, a ground or a stadium provided with night game equipment. In the owl beam illumination, it is necessary to determine light distribution so that light is not leaked to a residential area near a ground or the like.

For that reason, an optical member for controlling light distribution of the light emitted from LEDs needs to be used in an LED illumination device for owl beam illumination. Typically, in the owl beam illumination, the vertical light distribution is controlled at a predetermined angle. Thus, in an illumination device having a plurality of LEDs disposed in a matrix form, a plurality of elongated optical members for controlling light distribution of LEDs on a row-by-row basis is used in a parallel-arranged state.

However, even in the owl beam illumination, it is sometimes required to control not only the vertical light distribution but also the horizontal light distribution. In this case, it is necessary to individually provide optical members in individual LEDs instead of using an elongated optical member which collectively controls light distribution of a plurality of LEDs. However, it is typical that a larger number of LEDs are used in an LED illumination device of a higher luminance. In the case where the optical members are individually disposed in the LEDs and are fixed to the illumination device, the manufacturing process is time-consuming and the productivity is poor.

SUMMARY OF THE INVENTION

In view of the above, the disclosure provides an illumination device which includes an optical member capable of controlling vertical light distribution and horizontal light distribution and which makes it easy to install the optical member while improving the productivity of the illumination device.

In accordance with an aspect, there is provided an illumination device includes a light source, a device body to which the light source is mounted, and an optical member configured to control light distribution of light emitted from the light source. The light source includes LEDs arranged in a matrix form or a linear form. The optical member includes a lens portion configured to control light distribution of the LEDs on a row-by-row basis. The lens portion includes a recessed incidence portion on which the light emitted from the LEDs is incident, an elongated emission portion opposite to the incidence portion, and a pair of reflection portions which interconnects the incidence portion and the emission portion along a longitudinal direction thereof and totally reflects the light incident from the incidence portion. The emission portion is formed to have a plurality of successive convex surfaces when seen in a cross section taken along the longitudinal direction thereof.

With such configurations, the vertical light distribution of the illumination device can be controlled by the lens portion which collectively controls the light distribution of the LEDs arranged in rows. Furthermore, the horizontal light distribution of the illumination device can be controlled by the convex surfaces of the lens portion. Since the lens portion collectively controls the light distribution of the LEDs arranged in rows, it is only necessary that the optical member provided with the lens portion be installed in the device body. As compared with a case where individual optical members are installed in the respective LEDs, it is easy to install the optical member. It is also possible to improve the productivity of the illumination device.

DETAILED DESCRIPTION

An illumination device according to one embodiment of the present invention will be described with reference to FIGS. 1 to 10. In the embodiment described below, it is assumed that the present illumination device is a projector for owl beam illumination which projects light toward a ground, a farm field, etc.

Figure 1:
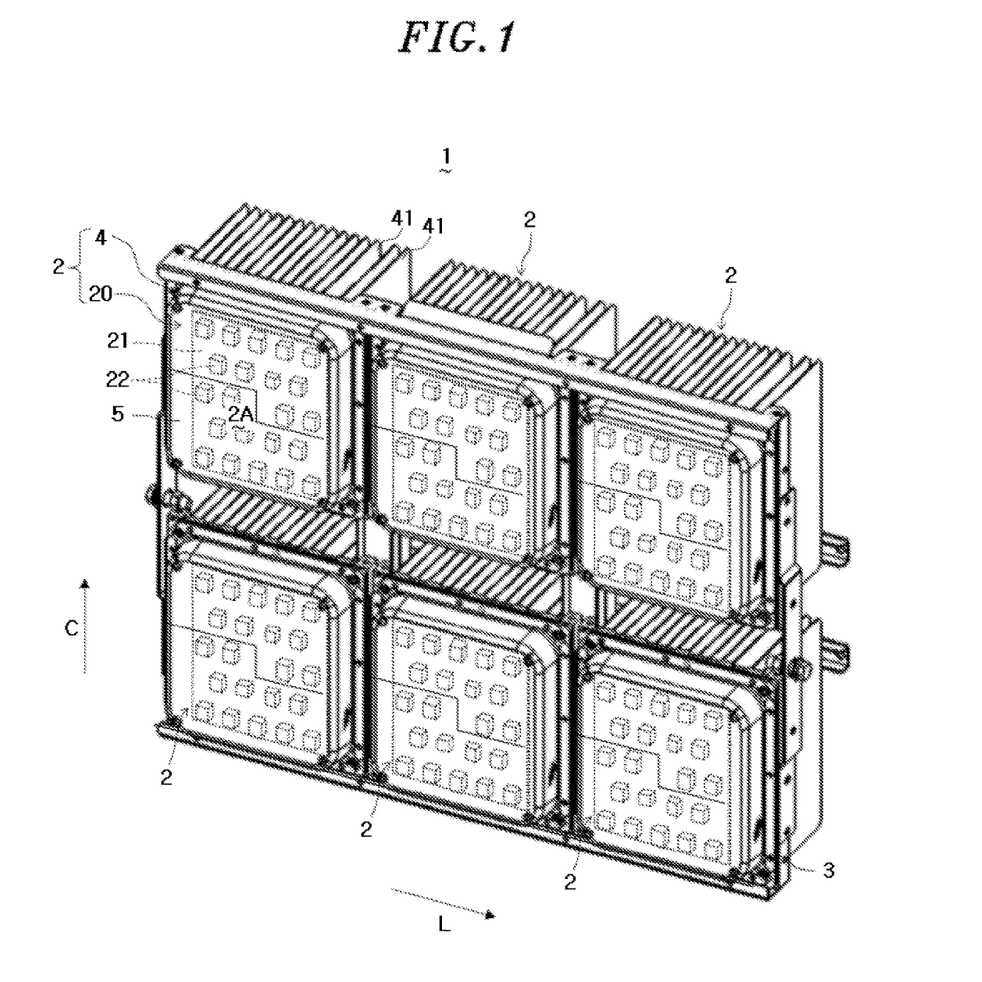
FIG. 1 is a perspective view of an illumination device according to one embodiment of the present invention, which is seen at the light emission surface side.

As illustrated in FIG. 1, the illumination device 1 includes a plurality of light source units 2 and a holding frame 3 which integrally holds the light source units 2. Each of the light source units 2 includes a rectangular flat-plate-shaped light source 20 having a light emission surface 2A (see FIG. 1) on one surface thereof, a device body 4 on which the light source 20 is mounted, and an optical member 5 which controls light distribution of the light source 20. The device body 4 includes a heat dissipation portion provided at the surface thereof opposite to the light emission surface 2A of the light source 20. The device body 4 dissipates outward the heat generated by the light emission of the light source 20. While a configuration using a plurality of light source units 2 is disclosed herein, it may be possible to use a single light source unit 2, in which case the light source unit 2 becomes the illumination device 1.

The light source units 2 are arranged in a matrix form. The number of the light source units 2 arranged in the row direction L (the horizontal direction in the illustrated example) parallel to one side of the light source 20 is equal to or larger than the number of the light source units 2 arranged in the column direction C (the vertical direction in the illustrated example) orthogonal to the row direction L. In the illustrated example, the light source units 2 has a 3×2 matrix form in which three light source units 2 are arranged in the row direction L and two light source units 2 are arranged in the column direction C. A predetermined gap is provided between the light source units 2 adjoining each other in the column direction C. The light source units 2 adjoining each other in the row direction L are disposed adjacent to each other.

The light source 20 includes a wiring substrate 21 provided at the side of the light emission surface 2A and a plurality of LEDs 22 (see FIG. 2B to be described later) mounted to the wiring substrate 21 in a matrix form. Each of the LEDs 22 includes, for example, a blue LED chip which emits blue light, an encapsulation material which encapsulates the blue LED chip and phosphors which are dispersed in the encapsulation material to convert blue light to yellow light. The light source 20 emits white light by mixing the blue light and the yellow light with each other.

The device body 4 includes, as the heat dissipation portion, a plurality of plate-shaped fins 41 provided in an orthogonal relationship with the light emission surface 2A. The plate-shaped fins 41 are juxtaposed parallel to the column direction C. The plate-shaped fins 41 are made of a material having high heat conductivity and high rigidity, e.g., aluminum or copper. Each of the light source units 2 includes a power source unit (not illustrated) disposed inside or outside the device body 4. The power source unit is connected to a commercial power source (not illustrated) and is provided therein with a lighting circuit (not illustrated) which controls the power supply from the commercial power source to the LEDs 22.

Figure 2A:
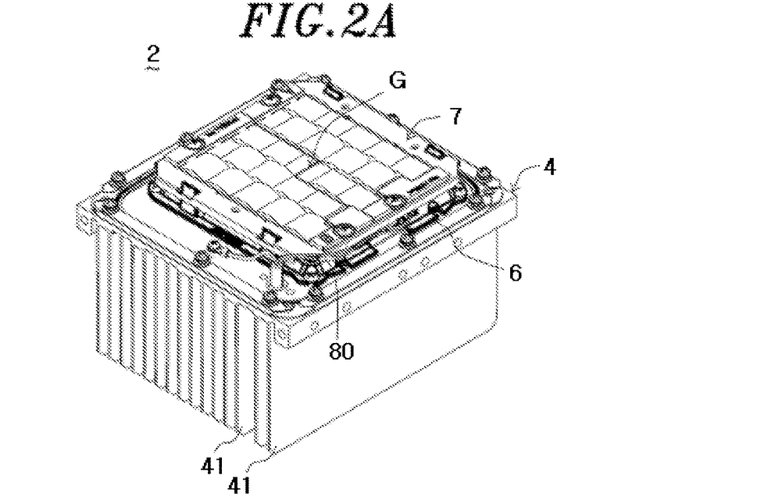
FIG. 2A is a perspective view of a light source unit of the illumination device.
Figure 2B:
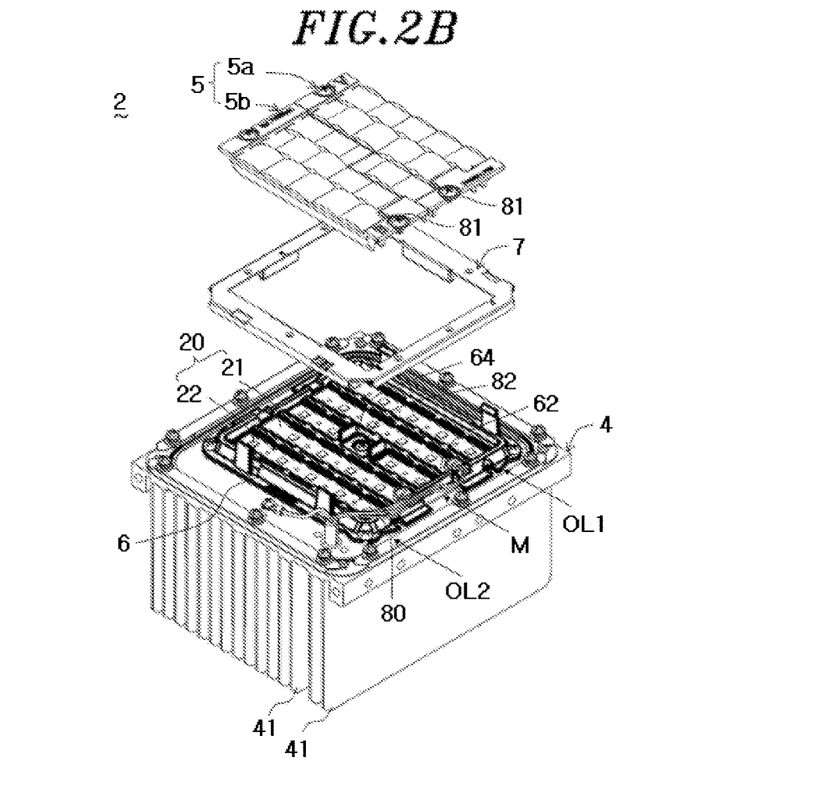
FIG. 2B is an exploded perspective view thereof.
Figure 3A:
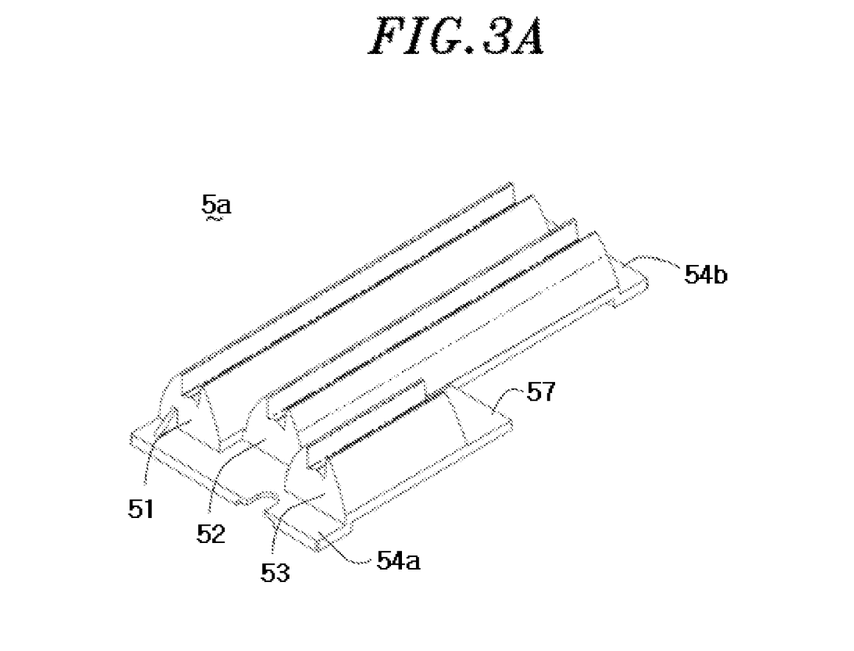
FIG. 3A is a top perspective view of a first member which constitutes an optical member.
Figure 3B:
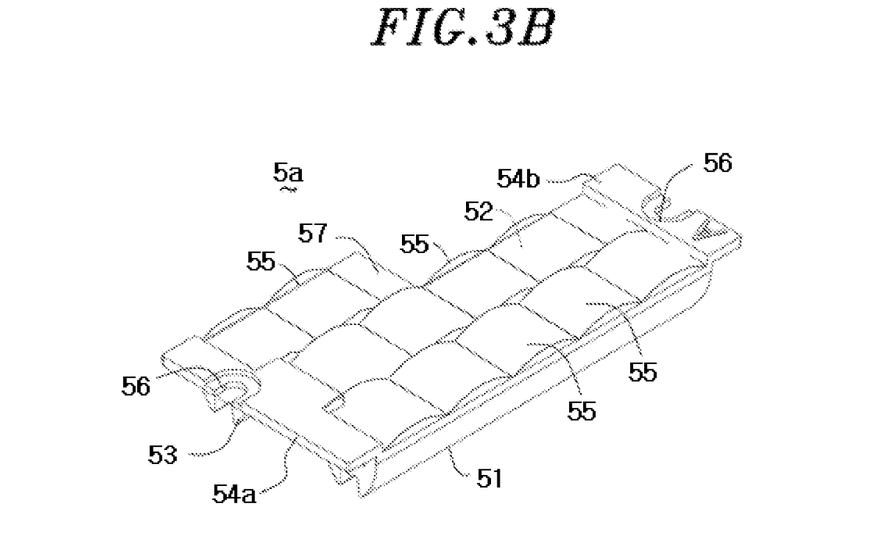
FIG. 3B is a bottom perspective view thereof.

As illustrated in FIGS. 2A and 2B, each of the light source units 2 further includes a fixing base 6 fixed to the device body 4 and a mounting frame 7 to which the optical member 5 is fixed. The mounting frame 7 is locked to the fixing base 6 to be installed on the device body 4. The LEDs 22 are arranged in three or more rows in a matrix form. In this example, the LEDs 22 are provided in five rows. Three or more LEDs, four or five LEDs 22 in this example, are included in each of the rows. In the region other than the central portion of the wiring substrate 21, the LEDs 22 are arranged in a zigzag lattice pattern (particularly, see FIG. 2B).

As illustrated in FIG. 2B, the optical member 5 includes a first member 5a and a second member 5b which are formed as separate bodies. As will be described later, the first member 5a and the second member 5b have the same light distribution characteristic. The first member 5a and the second member 5b are made of a light-transmitting material which transmits white light emitted from the LEDs 22, for example, a transparent polycarbonate resin, a transparent acryl resin or a transparent glass.

As illustrated in FIG. 2B, the first member 5a is provided to cover the LEDs 22 of one or more rows (two rows in this example) including one outermost row OL1 and some of the LEDs 22 in a middle row M at the central side of the outermost row OL1 (two LEDs 22 existing at the right side in the middle row M in this example). Furthermore, the second member 5b is provided to cover the LEDs 22 of one or more rows (two rows in this example) including the other outermost row OL2 and the remaining LEDs 22 in the middle row M which are not covered by the first member 5a (two LEDs 22 existing at the left side in the middle row M in this example).

As illustrated in FIGS. 3A, 3B and 4A to 4E, the first member 5a includes a plurality of lens portions 51, 52 and 53 which controls light distribution of the LEDs 22 on a row-by-row basis and a pair of connection portions 54a and 54b which interconnects the lens portions 51, 52 and 53. The lens portions 51, 52 and 53 and the connection portions 54a and 54b are unified together. The lens portions 51, 52 and 53 are formed in an elongated band shape so as to extend in the row direction of the LEDs 22 arranged in a matrix form.

The lens portion 51 is provided to cover the LEDs 22 in the outermost row OL1. The lens portion 52 is provided to cover the LEDs 22 in the row next to the outermost row OL1. The lens portion 53 is provided to cover the LEDs 22 disposed in a portion of the middle row M. In this example, as illustrated in FIG. 2B, the LEDs 22 are arranged in a zigzag lattice pattern. The number of the LEDs 22 of the outermost row OL1 is five and the number of the LEDs 22 of the row next to the outermost row OL1 is four. For that reason, as illustrated in FIG. 4B, in accordance with the arrangement of the LEDs 22, the lens portion 51 provided to cover the LEDs 22 of the outermost row OL1 is formed longer than the lens portion 52 provided to cover the LEDs 22 in the row next to the outermost row OL1. Alternatively, the lens portion 52 may have the same length as the length of the lens portion 51. The lens portion 53 provided to cover the LEDs 22 in the middle row M is provided to cover two LEDs 22 in the middle row M and is therefore formed shorter than the lens portion 52.

Figure 4A:
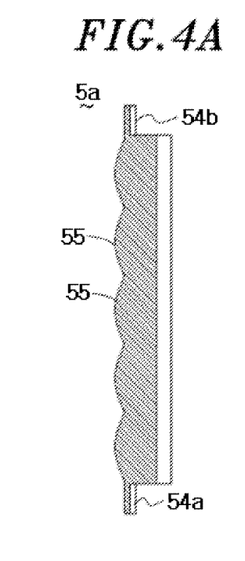
FIG. 4A is a longitudinal side sectional view of the first member.
Figure 4B:
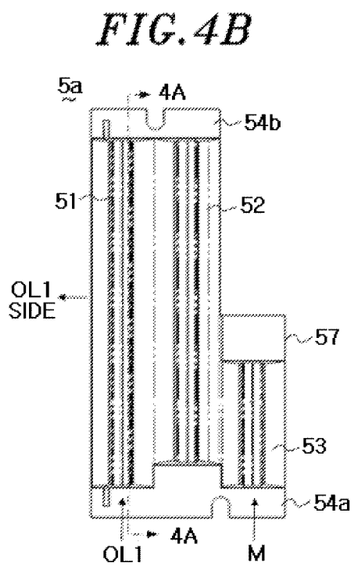
FIG. 4B is a bottom view thereof.
Figures 4C, 4D:
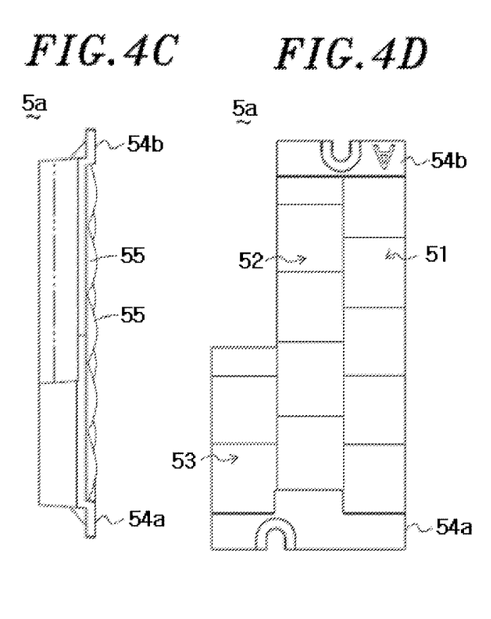
FIG. 4C is a longitudinal side view thereof.
FIG. 4D is a top view thereof.

Furthermore, each of the lens portions 51, 52 and 53 includes a plurality of successive convex surfaces 55 on the light emission surface thereof as can be seen in a cross section taken along the longitudinal direction (particularly, see FIGS. 2A and 4A). Each of the lens portions 51, 52 and 53 includes cylindrical portions which have axes orthogonal to both the longitudinal direction thereof and the optical axes of the LEDs 22. The cylindrical portions partially protrude from the light emission surface of each of the lens portions 51, 52 and 53. The side surfaces of the cylindrical portions become the convex surfaces 55. The successive convex surfaces 55 are provided in a corresponding relationship with the positions of the LEDs 22 arranged in a zigzag lattice pattern (particularly, see FIG. 2B).

One connection portion 54*a* is formed of a plate-shape member which interconnects one end portions of the lens portions 51, 52 and 53. The other connection portion 54*b* interconnects the other end portions of the lens portions 51 and 52. Each of the connection portions 54*a* and 54*b* is provided with a screw hole 56 having a countersink for accommodating a screw head. By inserting a screw 81 (see FIGS. 2A and 2B) into the screw hole 56, the first member 5*a* is fixed to the mounting frame 7. Furthermore, the first member 5*a* includes a flat portion 57 formed in the opposite end portion of the lens portion 53 from the connection portion 54*a* and facing the middle row M of the light source unit 2.

Figure 4E:
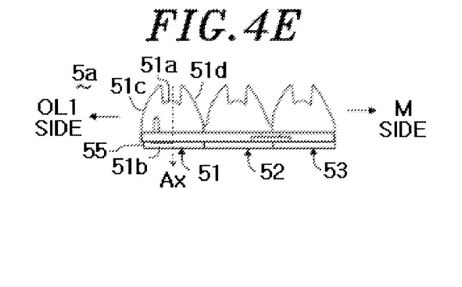
FIG. 4E is a lateral side view thereof.
Figure 5A:
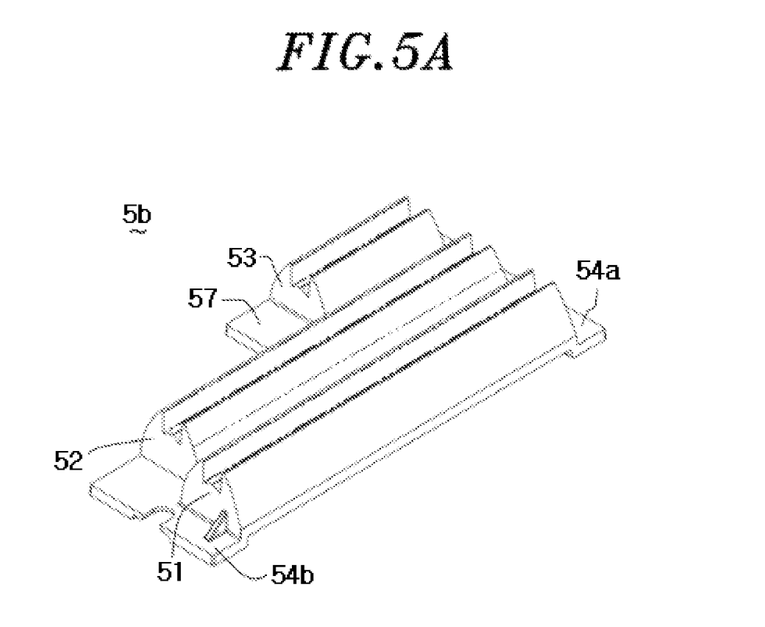
FIG. 5A is a top perspective view of a second member which constitutes the optical member.
Figure 5B:
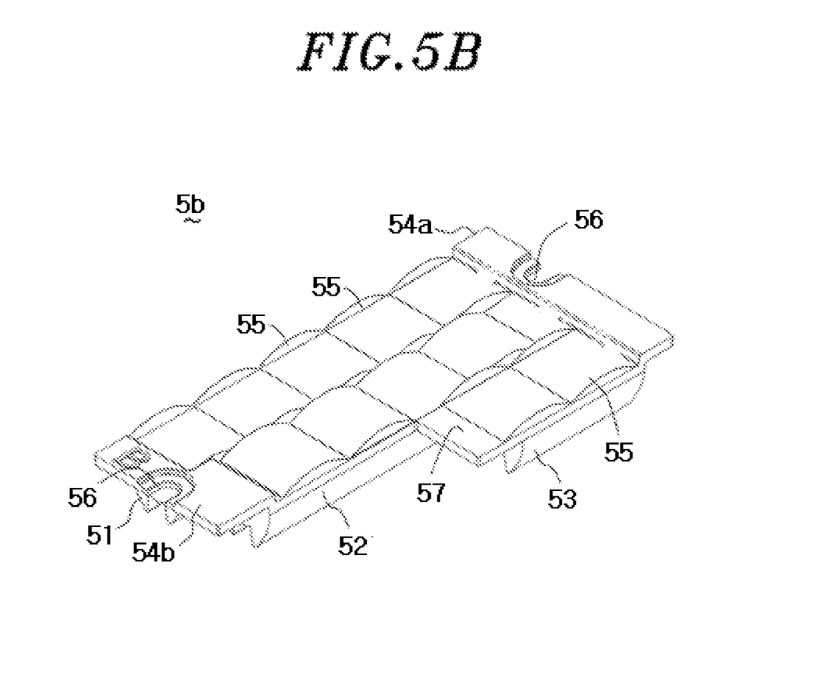
FIG. 5B is a bottom perspective view thereof.

The lens portion 51 includes a recessed incidence portion 51*a* on which the light emitted from the LEDs 22 is incident, an elongated flat emission portion 51*b* which confronts the incidence portion 51*a*, and a pair of reflection portions 51*c* and 51*d* which interconnects the incidence portion 51*a* and the emission portion 51*b* and totally reflects the light incident from the incidence portion 51*a* (see FIG. 4E). As described above, the convex surfaces 55 are formed in the emission portion 51*b*. Each of the lens portions 52 and 53 includes an incidence portion, an emission portion and a pair of reflection portions which are similar to those of the lens portion 51 (the corresponding reference symbols are not shown, which holds true in the following descriptions).

The incidence portion 51*a* is formed so that the facing surface which faces the LEDs 22 has a concave shape. The majority of the light incident on the facing surface is controlled to be distributed in the direction of the optical axes Ax of the LEDs 22 and is emitted from the emission portion 51*b*. Furthermore, the majority of the light incident on the side surface of the incidence portion 51*a* is totally reflected by the reflection portions 51*c* and 51*d* and is emitted from the emission portion 51*b*. Moreover, the reflection portions 51*c* and 51*d* are asymmetrical with each other when seen in a lateral cross section thereof. More specifically, the reflection portion 51*c* at the outermost row OL1 side has a rounded parabolic shape, whereas the reflection portion 51*d* at the middle row M side is more planar in shape than the reflection portion 51*c*.

As illustrated in FIGS. 5A, 5B and 6A to 6E, the second member 5*b* includes a plurality of lens portions 51, 52 and 53 which controls light distribution of the LEDs 22 on a row-by-row basis and a pair of connection portions 54*a* and 54*b* which interconnects the lens portions 51, 52 and 53. In this regard, the lens portion 51 is provided to cover the LEDs 22 in the outermost row OL2. The lens portion 52 is provided to cover the LEDs 22 in the row next to the outermost row OL2. The lens portion 53 is provided to cover the LEDs 22 disposed in a portion of the middle row M. Similar to the descriptions made above, the second member 5*b* includes screw holes 56 provided in the connection portions 54*a* and 54*b* and a flat portion 57 provided in the end portion of the lens portion 53 disposed to cover the LEDs 22 of the middle row M.

Figure 6A:
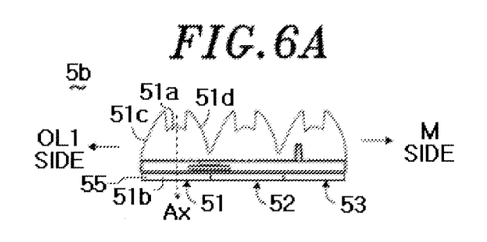
FIG. 6A is a lateral side view of the second member.
Figure 6B:
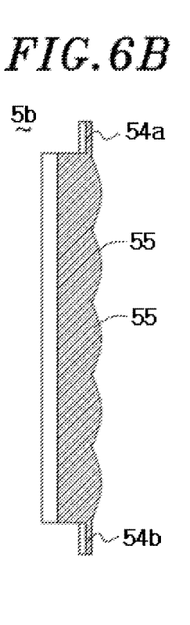
FIG. 6B is a longitudinal side sectional view thereof.
Figure 6C:
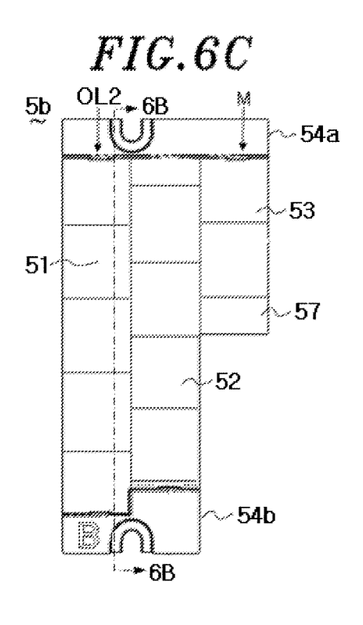
FIG. 6C is a top view thereof.
Figure 6D:
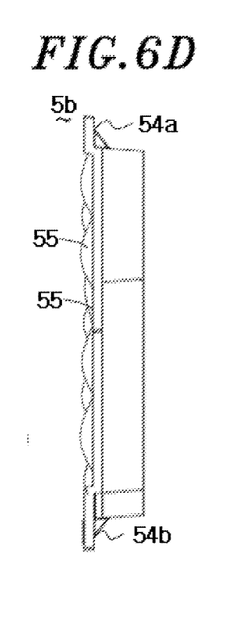
FIG. 6D is a longitudinal side view.
Figure 6E:
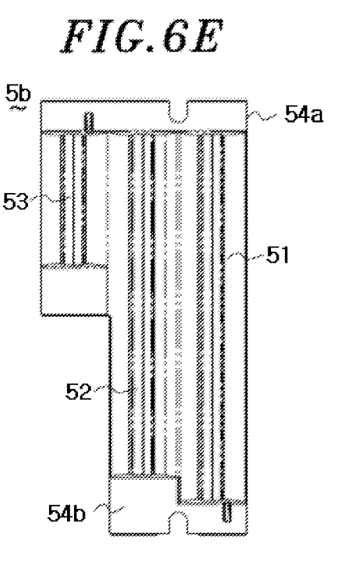
FIG. 6E is a bottom view thereof.

As illustrated in FIG. 6A, the second member 5*b* differs from the first member 5*a* in that the reflection portion 51*d* at the middle row M side in the lens portion 51 has a rounded parabolic shape, whereas the reflection portion 51*c* at the outermost row OL2 side is more planar in shape than the reflection portion 51*d*. For that reason, the first member 5*a* and the second member 5*b* have the same light distribution characteristic when they are combined. That is to say, the first member 5*a* and the second member 5*b* differ from each other in the shape of the reflection portions 51*c* and 51*d* and, therefore, can serve as a single optical member 5 even though they are formed as separate bodies.

Figure 7:
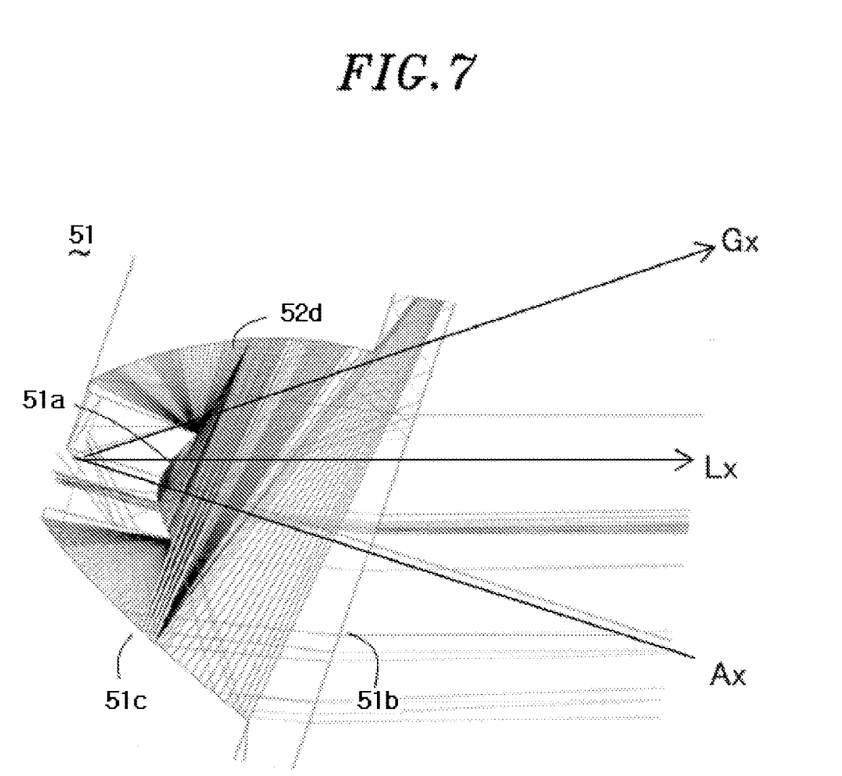
FIG. 7 is a light path view illustrating the light distribution of a lens portion of the first member.

As illustrated in FIG. 7, in the case of, e.g., the lens portion 51 of the second member 5*b*, one reflection portion 51*d* is more curved than the other reflection portion 51*c*. Thus, the light incident on the lens portion 51 from the side surface of the incidence portion 51*a* is reflected by the reflection portion 51*d* in the direction shifted toward the lens center from the optical axis Ax of each of the LEDs 22. As a result, in the direction inclined at a predetermined angle from the optical axis Ax, it is possible to increase the light flux flowing in a device optical axis Lx direction in which the maximum luminous intensity of the illumination device 1 (the light source units 2) can be obtained. The other reflection portion 51*c* reflects light in the direction parallel to the direction of the optical axis Ax of each of the LEDs 22. It is therefore possible to reduce the light flux flowing in the direction of a glare regulation angle Gx shifted upward of the device (10 degrees shifted upward from the device optical axis Lx).

Figure 8A:
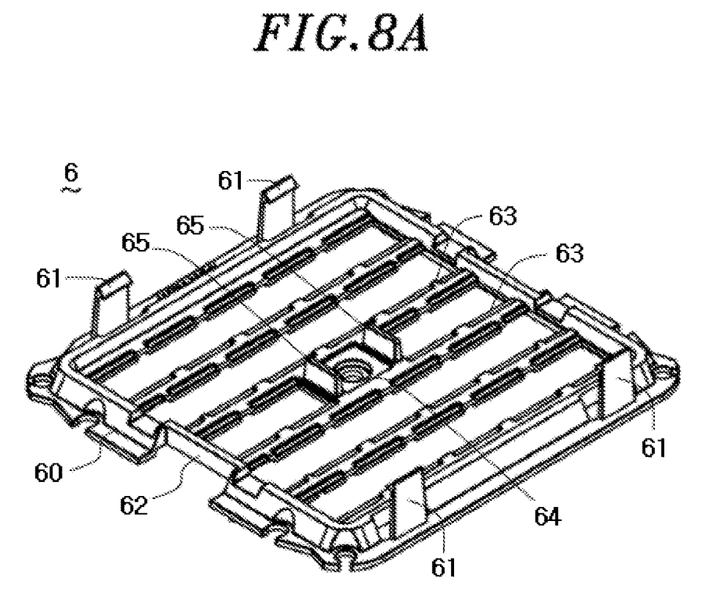
FIG. 8A is a top perspective view of a fixing base of the light source unit.
Figure 8B:
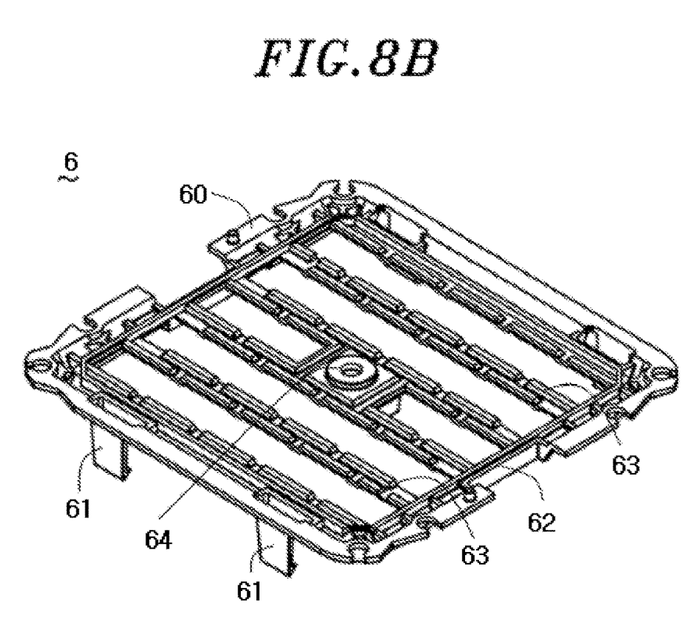
FIG. 8B is a bottom perspective view thereof.

As illustrated in FIGS. 8A and 8B, the fixing base 6 includes a rectangular frame body 60 and engagement claw portions 61 erected in two pairs from two opposite sides of the frame body 60 so as to engage with the mounting frame 7. The fixing base 6 is made of a hard resin material, e.g., an ABS resin. In the fixing base 6, a recess portion 62 is formed on at least one side of the frame body 60. A lead wire 80 (see FIGS. 2A and 2B) extending from a connection terminal (not illustrated) connected to an external power source is inserted into the recess portion 62. The end portion of the lead wire 80 is connected to the wiring substrate 21.

A plurality of beam portions 63 is provided inside the frame body 60 in a corresponding relationship with the LEDs 22 arranged in a matrix form. The beam portions 63 fill the gaps between the lower ends of the incidence portions 51*a* of the lens portions 51, 52 and 53 and the wiring substrate 21, thereby suppressing the leakage of light from the gaps. Among the beam portions 63, two beam portions 63 corresponding to the middle row M of the first member 5*a* and the second member 5*b* are provided with a fixing portion 64 for fixing the fixing base 6 to the device body 4. As illustrated in FIG. 2B, the LEDs 22 are not disposed in the central portion of the middle row M of the light source 20. The central portion of the middle row M of the light source 20 becomes a screw receiving portion for receiving a screw 82 inserted into a screw hole formed in the fixing portion 64.

At the opposite sides of the fixing portion 64, there is provided a pair of support portions 65 which supports the flat portions 57 of the first member 5*a* and the second member 5*b*. The middle portions of the first member 5*a* and the second member 5*b* existing farthest from the screw holes 56 formed in the connection portions 54*a* are supported by the support portions 65. Thus, the first member 5*a* and the second member 5*b* are stably held in place. As a result, it is possible to suppress deformation of the first member 5*a* and the second member 5*b* which may be caused by the heat of the LEDs 22.

Figure 9A:
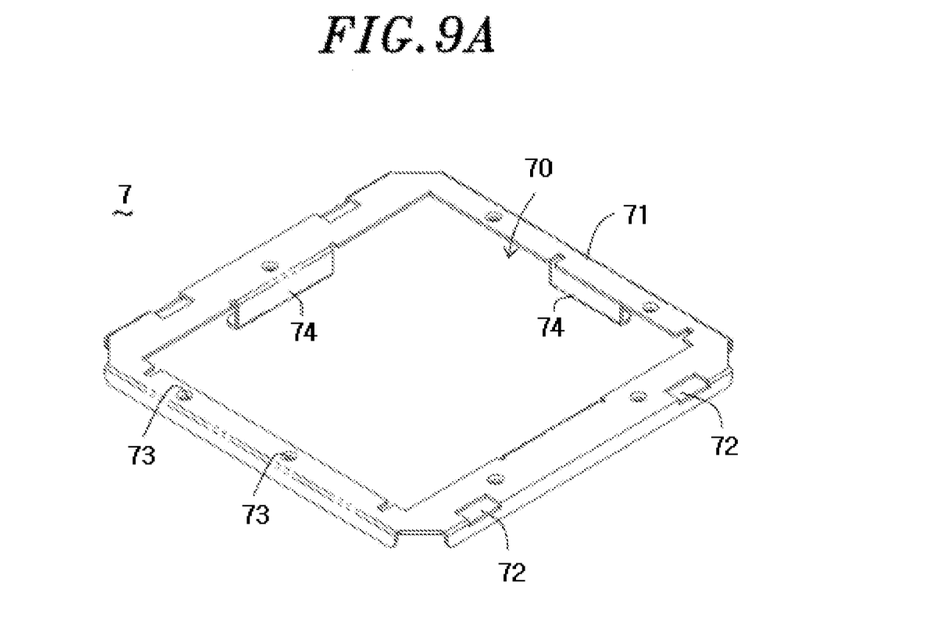
FIG. 9A is a top perspective view of a mounting frame of the light source unit.
Figure 9B:
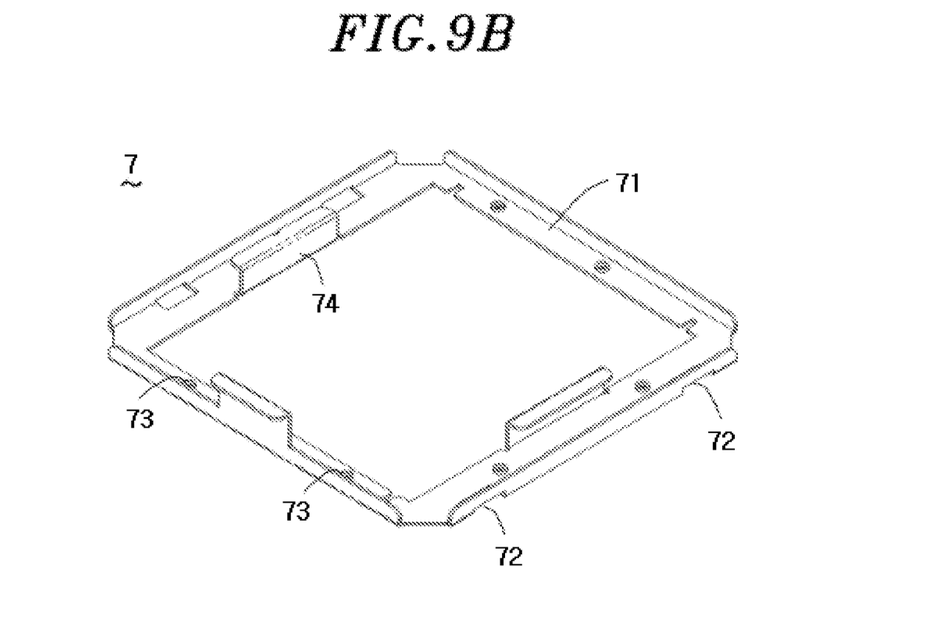
FIG. 9B is a bottom perspective view thereof.

As illustrated in FIGS. 9A and 9B, the mounting frame 7 includes a frame portion 71 that defines an opening 70 into which the lens portions 51, 52 and 53 of the first member 5*a* and the second member 5*b* are inserted. The frame portion 71 is a plate-shaped member formed parallel to the emission portions 51*b* of the lens portions 51, 52 and 53 and is made of a metallic material, e.g., aluminum. The frame portion 71 includes engagement grooves 72 which engage with the engagement claw portions 61 of the fixing base 6 and screw holes 73 into which the screws 81 (see FIG. 2B) for fixing the first member 5*a* and the second member 5*b* are inserted. Furthermore, the mounting frame 7 includes leg portions 74 erected from the frame portion 71 toward the device body 4. The spacing between the fixing base 6 and the mounting frame 7 is kept constant by the leg portions 74.

The frame portion 71 is a plate-shaped member formed parallel to the emission portions 51*b* of the lens portions 51, 52 and 53. In the case of, e.g., the lens portion 51, the light emitted from the LEDs 22 is incident on the side surface of the incidence portion 51*a*. The light which has reached the reflection portions 51*c* and 51*d* are totally reflected by the reflection portions 51*c* and 51*d* because the incidence angle of the majority of the light is greater than a critical angle. However, the light having an incidence angle smaller than the critical angle is transmitted through the reflection portions 51*c* and 51*d* and is leaked to the outside of the lens portions 51, 52 and 53. According to the present embodiment, the frame portion 71 is formed parallel to the emission portions 51*b* of the lens portions 51, 52 and 53. Thus, the frame portion 71 serves as a light shielding portion which shields the leaked light from the reflection portions 51*c* and 51*d*. This makes it possible to suppress irradiation of the light in the directions other than a desired direction.

According to this configuration, when the light source units 2 each provided with the optical member 5 are used as the illumination device 1 illustrated in FIG. 1, the light distribution in the column direction C is controlled by the reflection portions 51*c* and 51*d* of the lens portions 51, 52 and 53. Accordingly, it is possible to control the light distribution in the vertical direction of the illumination device 1. Furthermore, the light distribution in the row direction L is controlled in a focused manner by the convex surfaces 55 of the lens portions 51, 52 and 53. Accordingly, it is possible to control the light distribution in the horizontal direction of the illumination device 1.

Figure 10:
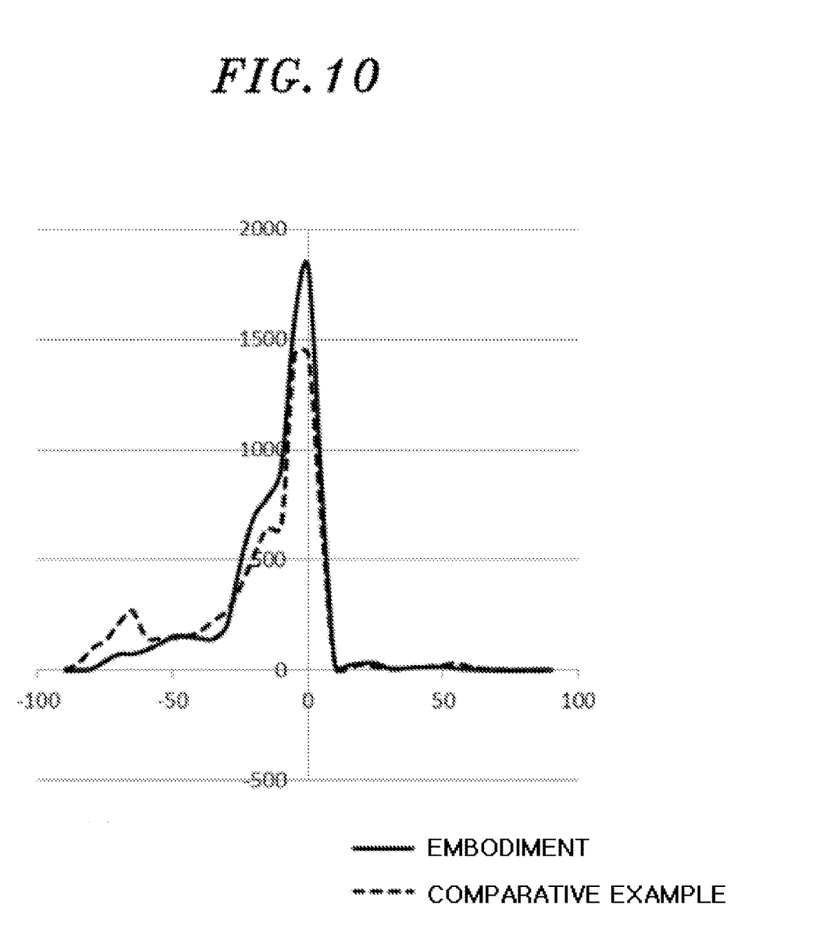
FIG. 10 is a view illustrating horizontal brightness distributions in the case of using an optical member of an example (a medium angle lens) provided with convex surfaces and an optical member of a comparative example (a wide angle lens) not provided with convex surfaces.

FIG. 10 is a view illustrating horizontal brightness distributions in the illumination device 1 using the optical member 5 of the embodiment (a medium angle lens) provided with the convex surfaces 55 formed in the lens portions 51, 52 and 53 and in the illumination device 1 using an optical member of a comparative example (a wide angle lens) not provided with the convex surfaces 55. As illustrated in FIG. 10, in the comparative example, a gentle brightness peak appears at a light distribution angle of about −70 degree, whereby wide light distribution is obtained. On the other hand, in the embodiment, the convex surfaces 55 act in a focused manner. Thus, when the light distribution angle falls within a range of 10 to −30 degrees, the brightness is higher than that of the comparative example. That is to say, in the optical member 5 provided with the convex surfaces 55 (the embodiment), it is possible to increase the brightness in the device optical axis direction.

Furthermore, in the light source units 2, the optical member 5 is formed of the first member 5*a* and the second member 5*b* which are separate bodies. Each of the first member 5*a* and the second member 5*b* is provided to cover the LEDs 22 of one or more rows including an outermost row OL1 or OL2 and some of the LEDs 22 in the middle row M at the central side of the outermost row OL1 or OL2. For that reason, as compared with a long band-shaped optical member provided to cover LEDs of one row, the first member 5*a* and the second member 5*b* are hardly deformed by the heat generated from the LEDs 22. Particularly, in the first member 5*a* and the second member 5*b* of the present embodiment, the lens portions 51, 52 and 53 of two and half rows are connected by the connection portions 54*a* and 54*b*. Thus, the first member 5*a* and the second member 5*b* are hardly deformed in the longitudinal direction of the lens portion 51 and in the direction orthogonal thereto. Furthermore, the lens portion 51 collectively controls the light distribution of the LEDs 22 arranged in rows. Therefore, it is only necessary that the optical member 5 provided with the lens portion 51 be installed in the device body 4. As compared with a case where individual optical members are installed in the respective LEDs 22, it is easy to install the optical member 5. It is also possible to improve the productivity of the illumination device.

Furthermore, the optical member 5 is fixed to the mounting frame 7 and is then locked to the fixing base 6 through the mounting frame 7, whereby the optical member 5 is fixed to the device body 4. Thus, it is easy to remove the optical member 5. This makes it possible to reduce the effort and time required in maintaining and repairing the optical member 5. By using the resin-made fixing base 6, the heat generated from the LEDs 22 and the wiring substrate 21 is hardly transferred to the optical member 5. It is therefore possible to make deformation of the optical member 5 difficult to occur.

Furthermore, the optical member 5 is installed in the device body 4 so that a predetermined air gap G is provided between the first member 5*a* and the second member 5*b*. The air existing between the wiring substrate 21 and the optical member 5 is discharged through the air gap G. This makes it possible to improve heat dissipation. As a result, it is possible to make deformation of the optical member 5 difficult to occur. Accordingly, even when the LEDs 22 are caused to emit light with high brightness and even when a large amount of heat is generated, the optical member 5 is hardly deformed. It is therefore possible to maintain a desired light distribution characteristic over a long period of time.

Figure 11A:
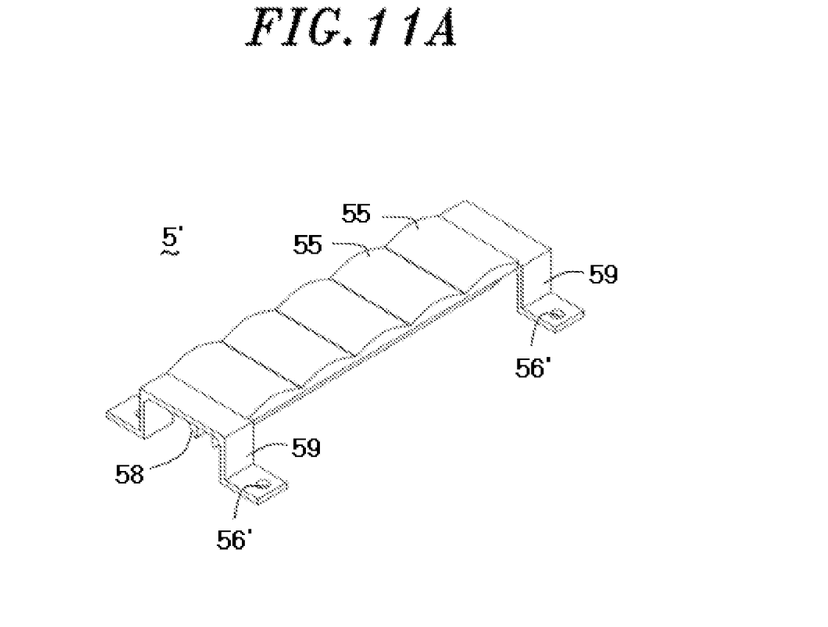
FIG. 11A is a top perspective view of an optical member of a light source unit of an illumination device according to a modification of the embodiment.
Figure 11B:
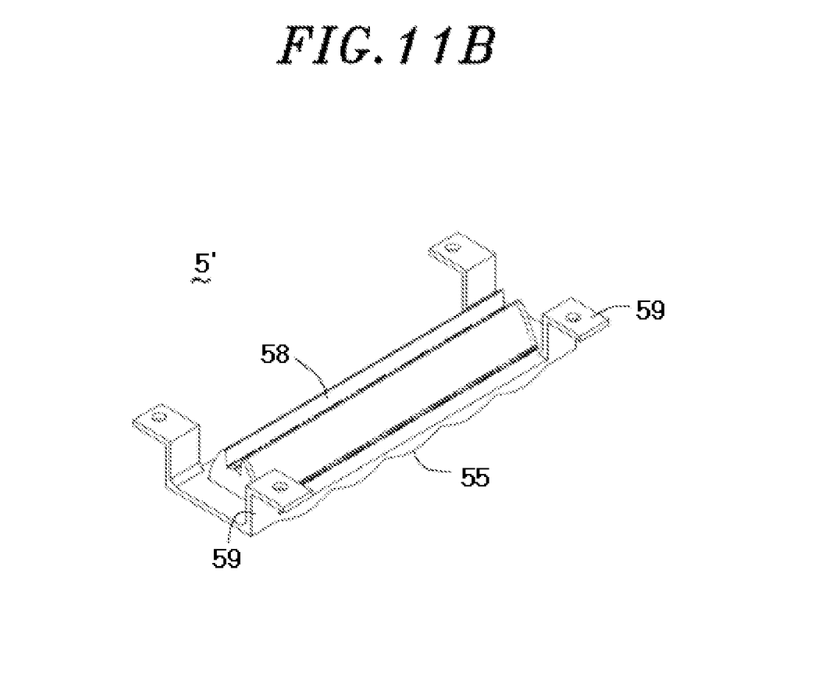
FIG. 11B is a bottom perspective view thereof.

Next, a modification of the above-described embodiment will be described with reference to FIGS. 11A and 11B. In this modification, there is illustrated a configuration which includes an optical member 5' individually provided on LEDs arranged in a linear form. As illustrated in FIGS. 11A and 11B, the optical member 5' of the present modification includes an elongate lens portion 58 having a plurality of successive convex surfaces 55 formed on an emission surface and leg portions 59 provided in the opposite end portions of the lens portion 58. Each of the leg portions 59 is provided with a screw hole 56' for allowing a screw 81 to be inserted therethrough. The optical member 5 is fixed to a device body (not illustrated) through the leg portions 59.

According to this modification, it is possible to appropriately install the optical member 5' depending on the arrangement of the LEDs of the light source units 2 (the illumination device 1). This makes it possible to improve the versatility of the optical member 5'.

The illumination device according to the present invention is not limited to the above-described embodiment and may be modified in many different forms. For example, while the configuration of the light source 20 having the LEDs 22 arranged in five rows has been illustrated in the above-described embodiment, the LEDs 22 may be arranged in six or more rows. Furthermore, the middle row M, on which one half of the first member 5a and one half of the second member 5b are provided, is not limited to the single row of the present example and may be two or more rows. The arrangement of the light source units 2 is not limited to the 3×2 matrix form described above and may be, e.g., a 4×3 or 10×4 matrix form. Moreover, the light source units 2 are preferably configured such that the number of the light source units 2 arranged in the row direction is larger than the number of the light source units 2 arranged in the column direction. By doing so, the heat generated during the light emission of the light source units 2 is riding on an updraft and is easily escaped vertically upward of the illumination device 1. This makes it possible to improve heat dissipation. Consequently, it is possible to prevent overheating of the illumination device 1 and to prevent malfunction or failure of the illumination device 1 due to thermal runaway. This effect is particularly important in the case where dissipation is reduced due to the increase in the number of the light source units 2 constituting the illumination device 1, or in a high output device such as a projector (the illumination device 1) or the like in which temperature rise is easy to occur during the light emission of the light source units 2.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination device, comprising:
   a light source;
   a device body to which the light source is mounted; and
   an optical member configured to control light distribution of light emitted from the light source,
   wherein the light source includes a plurality of LEDs (Light Emitting Diodes) arranged in multiple rows including two opposite outermost rows and an inner row therebetween,
   the optical member includes a first member and a second member, which are separated from each other and include plural lens portions,
   each of the lens portions extends in a row direction, covers at least a part of LEDs arranged in a row to control light distribution of light emitted from said at least the part of the LEDs and includes a recessed incidence portion on which the light emitted from said at least the part of the LEDs is incident, an emission portion opposite to the incidence portion, and a pair of reflection portions which interconnects the incidence portion and the emission portion and reflects light incident from the incidence portion, the incidence portion, the emission portion and the reflection portions extending in the row direction,
   the emission portion has a plurality of successive convex surfaces when seen in a cross section taken along the row direction,
   the first member is a unified body of a part of the lens portions provided to cover entire LEDs in one or more rows including one outermost row and a part of LEDs in the inner row, and
   the second member is a unified body of the remaining lens portions provided to cover entire LEDs in one or more rows including the other outermost row and the remaining LEDs in the inner row.

2. The illumination device of claim 1, wherein the LEDs in the rows are arranged in a zigzag lattice pattern, and
   the convex surfaces are respectively provided to correspond to said at least the part of the LEDs.

3. The illumination device of claim 1, further comprising:
   a fixing base fixed to the device body,
   wherein the fixing base includes support portions configured to support portions of the first member and the second member, the portions covering the LEDs in the inner row.

4. The illumination device of claim 3, further comprising:
   a connection portion,
   wherein lens portions in each of the first member and the second member are connected to the connection portion.

5. The illumination device of claim 4, further comprising:
   a mounting frame,
   wherein each of the first member and the second member is fixed to the mounting frame through the connection portion, and
   the mounting frame is locked to the fixing base.

* * * * *